US006879280B1

(12) United States Patent
Bull et al.

(10) Patent No.: US 6,879,280 B1
(45) Date of Patent: Apr. 12, 2005

(54) VERTICAL WEATHER PROFILE DISPLAY SYSTEM AND METHOD

(75) Inventors: Ian J. Bull, Lake Forest Park, WA (US); Steve Paramore, Cedar Rapids, IA (US); Daniel L. Woodell, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/878,165

(22) Filed: Jun. 28, 2004

(51) Int. Cl.[7] ............................................... G01S 13/95
(52) U.S. Cl. ..................... 342/26 B; 342/26 R; 342/52; 342/53; 342/89; 342/91; 342/175; 342/176; 342/182; 342/195; 702/2; 702/3
(58) Field of Search .............................. 342/26 R–26 D, 342/52–55, 175–186, 195, 82–103; 702/1, 2, 3, 4

(56) References Cited

U.S. PATENT DOCUMENTS

| | | | |
|---|---|---|---|
| 4,835,536 A | | 5/1989 | Piesinger et al. |
| 5,175,551 A | * | 12/1992 | Rubin ....................... 342/26 R |
| 5,440,483 A | * | 8/1995 | Badoche-Jacquet et al. ... 702/3 |
| 5,469,168 A | * | 11/1995 | Anderson .................. 342/26 R |
| 5,583,972 A | * | 12/1996 | Miller ....................... 342/26 D |
| 5,717,589 A | * | 2/1998 | Thompson et al. ............ 702/3 |
| 5,805,100 A | | 9/1998 | Becker et al. |
| 5,940,523 A | * | 8/1999 | Cornman et al. ......... 342/26 R |
| 5,974,360 A | * | 10/1999 | Otsuka et al. .................. 702/3 |
| 6,061,013 A | * | 5/2000 | Sauvageot et al. ........ 342/26 R |
| 6,125,328 A | * | 9/2000 | Baron et al. .................... 702/3 |
| 6,201,494 B1 | | 3/2001 | Kronfeld |
| 6,307,500 B1 | * | 10/2001 | Cornman et al. ......... 342/26 R |
| 6,339,747 B1 | * | 1/2002 | Daly et al. ...................... 702/3 |
| 6,340,946 B1 | * | 1/2002 | Wolfson et al. ........... 342/26 R |
| 6,424,288 B1 | | 7/2002 | Woodell |
| 6,441,773 B1 | | 8/2002 | Kelly et al. |
| 6,448,922 B1 | | 9/2002 | Kelly |
| 6,473,026 B1 | * | 10/2002 | Ali-Mehenni et al. .... 342/26 R |
| 6,501,392 B2 | | 12/2002 | Gremmert et al. |
| 6,512,476 B1 | | 1/2003 | Woodell |
| 6,581,009 B1 | * | 6/2003 | Smith ............................ 702/3 |
| 6,597,305 B2 | | 7/2003 | Szeto et al. |
| 6,650,275 B1 | | 11/2003 | Kelly et al. |

(Continued)

FOREIGN PATENT DOCUMENTS

| | | | | |
|---|---|---|---|---|
| EP | 0578544 A1 | * | 1/1994 | ........... G01S/13/95 |
| JP | 9-318767 A | * | 12/1997 | ........... G01W/1/10 |
| JP | 2000-75029 A | * | 3/2000 | ........... G01S/13/95 |
| WO | WO 01/35121 A1 | * | 5/2001 | ........... G01S/13/95 |

OTHER PUBLICATIONS

U.S. Appl. No. 10/631,253 for "Adaptive Weather Radar Detection System and Method Used in Continental and Maritime Environments" by Woodell et al., filed on Jul. 31, 2003, 15 pages plus cover page, 2 drawing sheets.

(Continued)

*Primary Examiner*—Bernarr E. Gregory
(74) *Attorney, Agent, or Firm*—Nathan O. Jensen; Kyle Eppele

(57) ABSTRACT

An aircraft weather radar system is disclosed. The system comprises a radar antenna, aircraft sensors, and a database. The system also comprises a processing device receiving information from the radar antenna and from the aircraft sensors and able to retrieve information from the database. Further, the system comprises a cockpit display coupled to the processing device. The processing device is programmed to estimate storm system characteristics based on the received information from the aircraft sensors and the database and to display the storm system characteristics on a vertical weather profile display using a graphical representation.

19 Claims, 5 Drawing Sheets

U.S. PATENT DOCUMENTS

| | | |
|---|---|---|
| 6,653,947 B2 | 11/2003 | Dwyer et al. |
| 6,667,710 B2 | 12/2003 | Cornell et al. |
| 6,690,317 B2 | 2/2004 | Szeto et al. |
| 6,707,415 B1 | 3/2004 | Christianson |
| 6,720,906 B2 | 4/2004 | Szeto et al. |

OTHER PUBLICATIONS

U.S. Appl. No. 10/631,316 for "Runway Obstacle Detection System and Method" by Woodell, filed on Jul. 31, 2003, 14 pages plus cover page, 3 drawing sheets.

U.S. Appl. No. 10/667,701 for "Enhanced Adaptive Weather Thresholds for Identification of Hazards System and Method" by Woodell et al., filed on Sep. 22, 2003, 16 pages plus cover page, 7 drawing sheets.

U.S. Patent Application for "Aircraft Capability and Hazard Zone Interface and Method" by Krenz et al., filed on Jun. 21, 2004, 12 pages plus cover page, 2 drawing sheets.

* cited by examiner

VERTICAL WEATHER PROFILE DISPLAY SYSTEM AND METHOD

BACKGROUND

Conventionally, pilots use weather radar to detect and then avoid hazardous weather. Conventional radar systems may produce the desired results only in a limited environment. Typically, airborne threshold systems are traceable to ground-based weather radar thresholds for wet precipitation generated from convective weather. As such, conventional aircraft radar systems are used to detect the amount of water in an air mass. Analysis and/or estimation of the characteristics of a weather cell or storm cell due to the precipitation or other weather conditions is typically not done.

Conventionally, radar thresholds map radar return strength to a display with color representing rain rate or alternatively a weather threat assessment level. Conventionally, the threat level has been previously described as primarily a function of radar reflectivity and a weaker function of temperature, altitude, and latitude or other information. Because of the ability of aircraft to circumnavigate storm system hazards, if recognized, it would therefore be desirable to provide an airborne radar system which has the ability to more accurately detect and report the existence and/or characteristics of storm systems. It may be possible for a pilot operating radar manually to be able to judge storm system characteristics as each pilot becomes familiar with the environment and the weather radar equipment. However, knowledge by the pilot must be acquired, and further, an increase in pilot workload is also necessitated. Therefore, there is a need for an automated system of detecting, analyzing, estimating and communicating storm system characteristics.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is an aircraft weather radar system. The system comprises a radar antenna, aircraft sensors, and a database. The system also comprises a processing device receiving information from the radar antenna and from the aircraft sensors and able to retrieve information from the database. Further, the system comprises a cockpit display coupled to the processing device. The processing device is programmed to estimate storm system characteristics based on the received information from the aircraft sensors and the database and to display the storm system characteristics on a vertical weather profile display using a graphical representation.

What is also provided is an aircraft weather radar system. The system comprises a radar means for providing radar returns, an aircraft sensor means for sensing environmental variables, and a database means for providing database information. The system also comprises a processing means for receiving information from the radar means and from the aircraft sensor means and able to retrieve information from the database. Further, the system comprises a cockpit display means coupled to the processing device for displaying a vertical weather profile. The processing means is programmed to estimate storm system characteristics based on the radar returns, the environmental variables and the database information and to display the storm system characteristics on the vertical weather profile using a graphical representation.

Further, what is provided is a method of providing hazard information to a flight crew member. The method comprises providing radar returns from a radar antenna circuit. The method also comprises sensing environmental variables using an aircraft sensor and providing database information based on information from the sensor and based on the radar returns. Further, the method comprises processing the radar returns, the environmental variables and the database information and displaying hazard information on a cockpit display in accordance with commands from the processing step. The processing step estimates storm system characteristics based on the radar returns, the environmental variables and the database information and causes display of the storm system characteristics on a vertical weather profile using a graphical representation.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
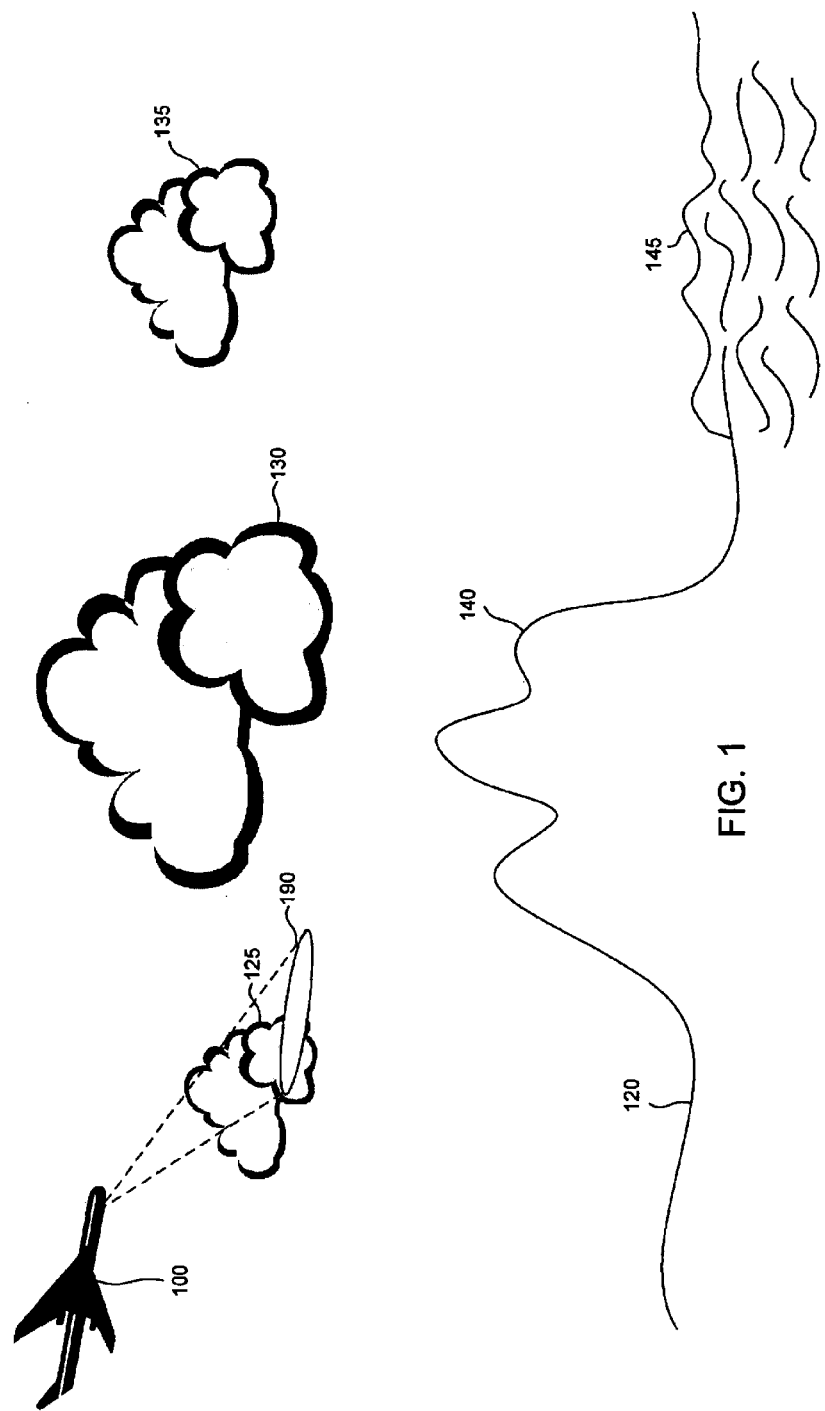
FIG. 1 is an exemplary diagram of an airplane having a weather radar system and flying in the atmosphere.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional aircraft systems, air carriers wish to detect threatening weather which may be a threat to the aircraft or passengers. Such threatening weather may be detected using on-board weather radar systems, however, conventional systems are not well suited for estimating characteristics such as but not limited to the size, rate of growth, direction of change, maximum height, predicted change, etc. of detected storm systems nor are conventional systems well suited for graphically providing readily useable information to air crew, such as may be provided on a vertical weather profile display.

Referring to FIG. 1, an aircraft 100 is depicted having a radar on board capable of casting a radar beam 190 and receiving reflective energy from weather systems 125, 130, 135 and the like. Weather systems 125, 130, and 135 may be representative of any of a variety of or type of weather systems. Weather system 130 may be over a mountainous terrain 140, for example, weather system 125 may be over a plain-like environment 120, and weather system 135 may be over water, etc.

Figure 2:
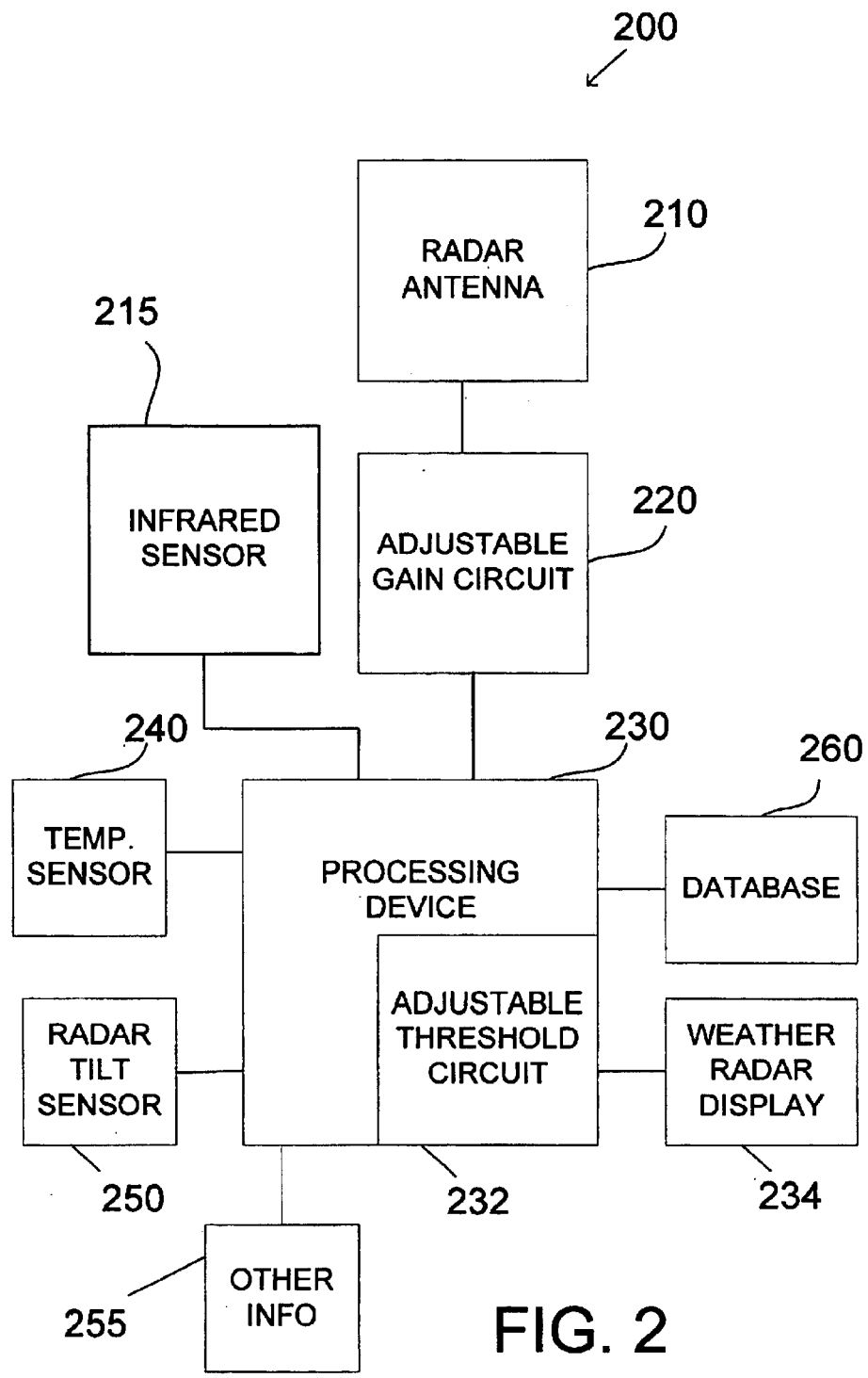
FIG. 2 is an exemplary block diagram of a radar system having an adjustable threshold circuit.
Figure 3:
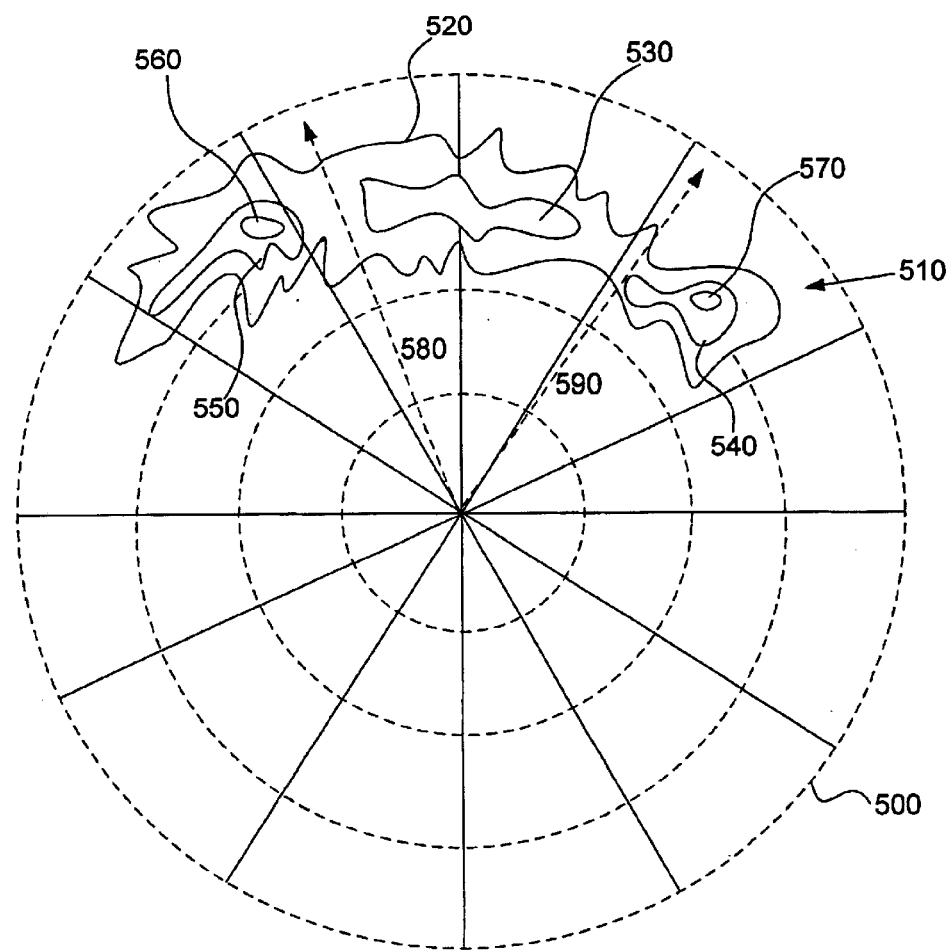
FIG. 3 is an exemplary depiction of a weather radar display.

Referring now to FIG. 2, a radar system 200 includes a radar antenna 210 for sending and receiving radar signals. System 205 may also include an adjustable gain circuit 220 that is configured to change the gain of the radar signal provided to radar antenna 210. Further system 205 may include an infrared sensor 215. Processing device 230 receives temperature data from a temperature sensor 240 and radar tilt sensor 250. In an exemplary embodiment, processing device 230 also accesses a database 260 which contains information relating to the type of weather, based on the input from weather radar 210 and infrared sensor 215. Processing device 230 may also be configured with instructions which calculate and/or determine an appropriate adjustable threshold command via a control law which is based on the type of weather or hazard being observed. The adjustable threshold command is to be communicated to an adjustable threshold circuit 232 based on data supplied to processing circuit 230 such as but not limited to the weather type, temperature inputs, and the radar beam direction. Further, other information 255 such as latitude, longitude, location, time of day, time of year, etc. may also be used to make the gain; adjustment. Database 260 may be used to determine the weather type or weather hazard being detected. Further, the sensor information and database information may be used to estimate characteristics of a storm cell.

The radar returns may be normalized depending on the environment in which it is detected. This may be used for any type of weather radar that operates in a range of environments. This includes simple auto-tilt radars, manual radars, as well as fully automatic systems which use all possible environmental data including but not limited to the WXR-2100 multiscan radar available from Rockwell Collins of Cedar Rapids, Iowa.

Figure 4:
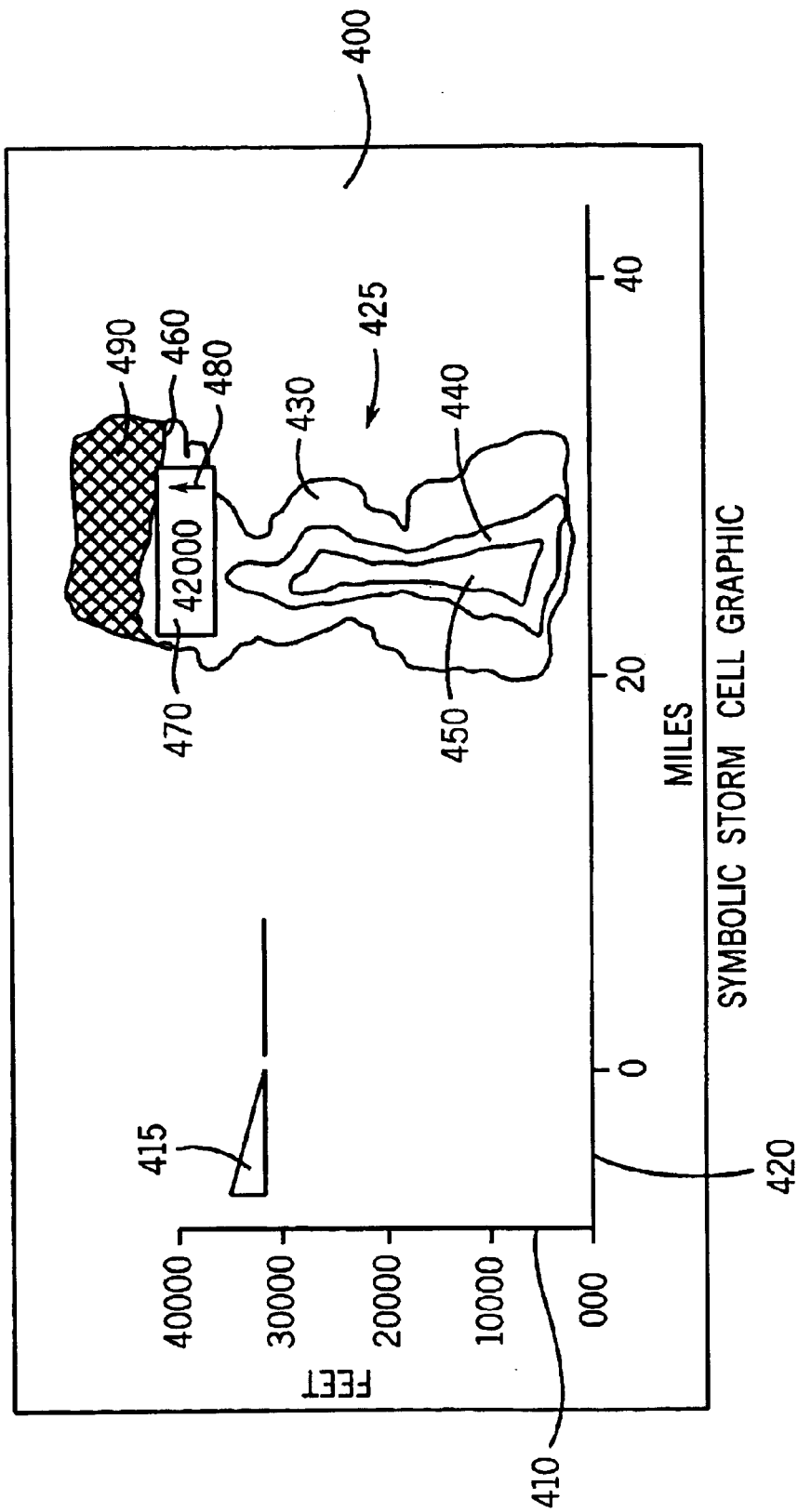
FIG. 4 is an exemplary depiction of an enhanced vertical weather profile display.
Figure 5:
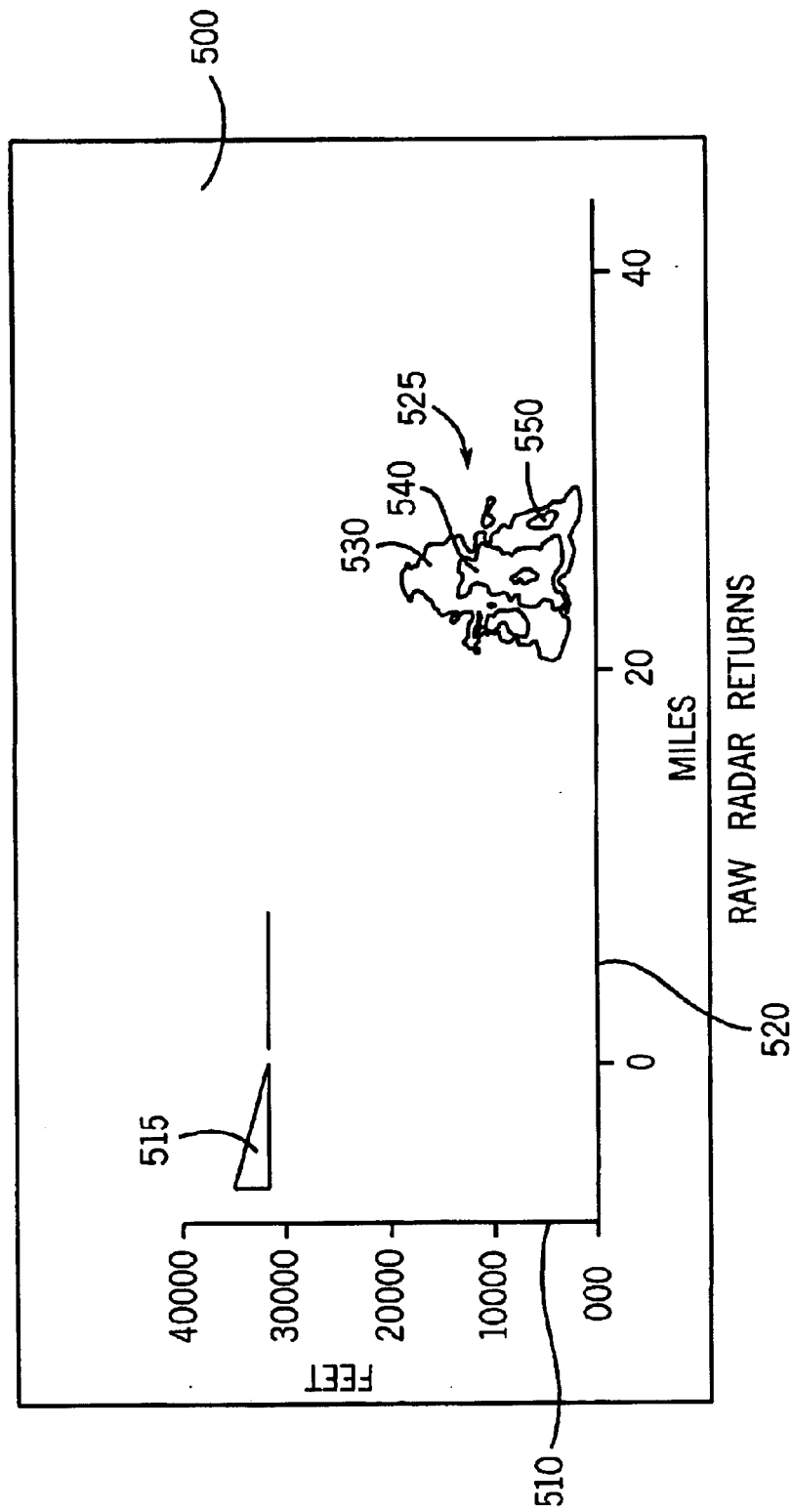
FIG. 5 is an exemplary depiction of a display of raw radar returns on a vertical weather radar display.

Radar and sensors may be combined with database information and used to estimate atmospheric conditions. The information may then be processed and refined and displayed in the cockpit in a standardized format. This standardized cockpit display may use an iconic representation of the storm, which presents the salient information to the pilot with less need for interpretation. As an example, it may be desirable to provide graphical representation of computed and/or estimated storm characteristics (as depicted in FIG. 4) which may not be apparent from a display of the raw radar return data, as depicted in FIG. 5. Such computed information may be provided in a vertical weather profile display.

Most of the reflectivity for a storm originates from the moisture that it contains and often the top of the storm is significantly higher than the moisture based radar reflectivity would indicate. A conventional reflection only sweep of the vertical profile of a storm as depicted in FIG. 5 would therefore provide only limited utility to the pilot. The actual storm top or estimated storm top can not be seen by the pilot.

Also, at longer ranges the growing width of the Radar beam means that the accuracy to which the top of the storm can be calculated, decreases. A typical solution to this problem is to limit the range at which storm top information is displayed, however operationally this is not necessarily the best approach. It may therefore be desirable to provide computed storm top information at ranges where the width of the radar-beam otherwise causes inaccuracy in the storm measurement. The computed storm top information would have a better accuracy than the measured storm top at these longer ranges.

Depicted in FIG. 5 is an example of a vertical weather profile display 500. The display includes an axis 510 providing altitude of an aircraft 515 and a second axis 520 providing range of a storm cell 525 from aircraft 515. Storm cell 525 is based on the raw data obtained from measurements of radar reflectivity and may be displayed in multiple colors represented by regions 530, 540, and 550, each of the multiple colors representative of a region of higher radar reflectivity, which may correspond to heavier precipitation. Such a display, however, is deficient in communicating to the air crew information which is helpful to the crew in making storm avoidance maneuvers and/or decisions. For example, the raw radar return do not provide the actual storm top, the estimated storm top of the storm at the time of aircraft arrival, etc.

An exemplary solution to this problem is to change the way in which the vertical weather profile is displayed from one that purely indicates the reflected radar returns such as depicted in FIG. 5. For example, an interpreted vertical profile graphic may be used to represent a storm profile that is shaped and sized based upon measured and estimated characteristics of the storm.

The characteristics of the storm may be computed using the Multiscan technology available from Rockwell Collins, Inc. of Cedar Rapids, Iowa that allows the following types of data to be obtained including but not limited to:

Location of the Storm Top,

Storm strength

Storm geographic characteristics

Vertical Air Mass Velocities

This information may then be used to create a more complete and useful picture of the storms vertical profile than could be achieved using raw "Rain Gauge" radar returns alone as depicted in FIG. 5.

The interpreted estimated, computed, or enhanced vertical profile graphic would then be used (adjusted in size, shape, etc.) to present this information to the pilot. An example of such a vertical profile graphic is depicted in FIG. 4.

Referring now to FIG. 4 an interpreted, estimated, enhanced, or computed vertical weather profile display 400 is depicted. Weather profile display 400 may include an altitude axis 410 and a range axis 420 providing range of storm cell 425 from an aircraft 415. Storm cell 425, as displayed, is a graphical representation of the size and severity of the actual storm cell, based on the raw radar returns depicted in FIG. 5. As in FIG. 5, the graphical representation may include one or more colors to represent the severity of the storm cell. In an exemplary embodiment the least severe portion 430 of storm cell 425 may be colored green. The more severe portion of storm cell 440 may be colored yellow and the most severe portion 450 of storm cell 425 may be colored red. Alternatively more and other categories of severity may be applied as well as different colors and color combinations.

Based on calculations, the storm top 460 may be estimated. Also, in display 400, the actual estimated maximum storm top height 470 may be provided. Additionally, an indication of the movement direction may be provided by arrow 480. Further, a graphical representation of the storm top uncertainty 490 is also provided. The storm top uncertainty region 490 may be a calculated estimate of the storm top when aircraft 415 arrives at the storm cell 425 or at any other predetermined time.

By annotating the symbol information such as the rate at which the storm is growing or diminishing; degree of uncertainty of the storm top height (function of range), can be much more clearly indicated to the flight crew.

In accordance with an exemplary embodiment, the uncertainty associated with the storm top height may be shown using a different color or fill pattern to differentiate it from the main portion of the graphic or alternatively may be blended with other portions of the graphic so that no difference is shown. This storm top uncertainty may occur due to inaccuracies in the beam width as the radar beam spreads as it travels further and further from the radar antenna and/or may be due to the dynamics of the storm cell itself.

This approach has significant benefits as it allows storm tops to be identified to much longer ranges than conventional methods. Further, providing graphical information in a vertical profile display of estimated storm cell characteristics, pilot may be provided with information which requires little experience or interpretation to apply in aircraft guidance decisions.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft weather radar system, comprising:
   a radar antenna;
   aircraft sensors;
   a database;
   a processing device receiving information from the radar antenna and from the aircraft sensors and able to retrieve information from the database; and
   a cockpit display coupled to the processing device,
   wherein the processing device is programmed to estimate storm system characteristics based on the information received from the aircraft sensors and the database and to display the storm system characteristics on a vertical weather profile display using a graphical representation.

2. The system of claim 1, wherein the characteristics comprise maximum storm cell height.

3. The system of claim 1, wherein the characteristics comprise storm cell top.

4. The system of claim 1, wherein the characteristics comprise vertical direction of storm cell change.

5. The system of claim 1, wherein the characteristics comprise estimated storm cell top at a predetermined time.

6. The system of claim 1, wherein the characteristics comprise a region of storm top uncertainty.

7. The system of claim 1, wherein the characteristics comprise a textual representation of a maximum storm cell height.

8. The system of claim 1, wherein the display utilizes a directional icon to represent cell change direction.

9. The system of claim 1, wherein the display utilizes a fill pattern, unique on the display, to represent a region of storm top uncertainty.

10. An aircraft weather radar system, comprising:
    a radar means for providing radar returns;
    an aircraft sensor means for sensing environmental variables;
    a database means for providing database information;
    a processing means for receiving information from the radar means and from the aircraft sensor means and able to retrieve information from the database; and
    a cockpit display means coupled to the processing device for displaying a vertical weather profile,
    wherein the processing means is programmed to estimate storm system characteristics based on the radar returns, the environmental variables and the database information and to display the storm system characteristic on the vertical weather profile using a graphical representation.

11. The system of claim 10, wherein the characteristics comprise maximum storm cell height.

12. The system of claim 10, wherein the characteristics comprise storm cell top.

13. The system of claim 10, wherein the characteristics comprise vertical direction of storm cell change.

14. The system of claim 10, wherein the characteristics comprise estimated storm cell top at a predetermined time.

15. The system of claim 10, wherein the characteristics comprise a region of storm top uncertainty.

16. The system of claim 10, wherein the characteristics comprise a textual representation of a maximum storm cell height.

17. The system of claim 10, wherein the display means utilizes a directional icon to represent cell change direction.

18. The system of claim 10, wherein the display means utilizes a fill pattern, unique on the display, to represent a region of storm top uncertainty.

19. A method of providing hazard information to a flight crew member, comprising:
    providing radar returns from a radar antenna circuit;
    sensing environmental variables using an aircraft sensor;
    providing database information based on information from the sensor and based on the radar returns;
    processing the radar returns the environmental variables and the database information; and
    displaying hazard information on a cockpit display in accordance with commands from the processing step,
    wherein the processing step estimates storm system characteristics based on the radar returns, the environmental variables and the database information and causes display of the storm system characteristics on a vertical weather profile display using a graphical representation.

* * * * *